Figure 1:
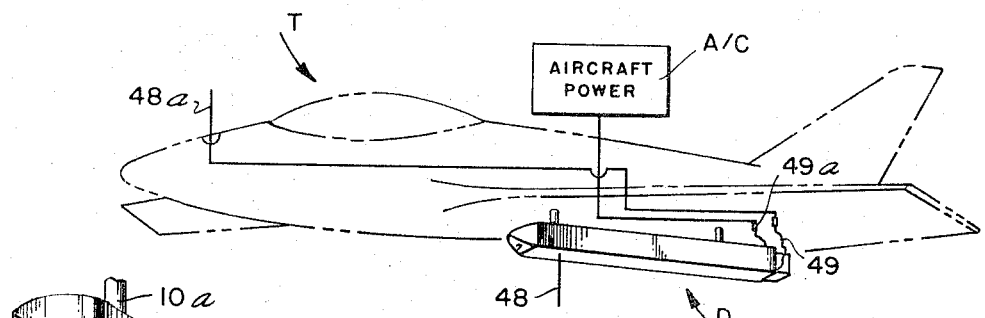

March 28, 1967

L. J. HOLT ET AL 3,311,324

DESTRUCT SYSTEM FOR TARGET AIRCRAFT

Filed June 25, 1965

4 Sheets-Sheet 1

INVENTORS.
LLOYD J. HOLT
HARRY L. MYERS
GORDON F. ZURN, JR.

BY

P. H. Firsht

ATTORNEY.

March 28, 1967

L. J. HOLT ET AL 3,311,324

DESTRUCT SYSTEM FOR TARGET AIRCRAFT

Filed June 25, 1965

4 Sheets-Sheet 2

INVENTORS.
LLOYD J. HOLT
HARRY L. MYERS
GORDON F. ZURN, JR.
BY
*P. H. Firsht*
ATTORNEY.

March 28, 1967 L. J. HOLT ET AL 3,311,324
DESTRUCT SYSTEM FOR TARGET AIRCRAFT
Filed June 25, 1965 4 Sheets-Sheet 4

INVENTORS.
LLOYD J. HOLT
HARRY L. MYERS
GORDON F. ZURN, JR.
BY
*P. H. Firsht*
ATTORNEY.

United States Patent Office 3,311,324
Patented Mar. 28, 1967

3,311,324
DESTRUCT SYSTEM FOR TARGET AIRCRAFT
Lloyd J. Holt, Ridgecrest, and Harry L. Myers and Gordon F. Zurn, Jr., China Lake, Calif., assignors to the United States of America as represented by the Secretary of the Navy
Filed June 25, 1965, Ser. No. 467,153
6 Claims. (Cl. 244—1)

The invention described herein may be manufactured and used by or for the Government of the United States of America for governmental purposes without the payment of any royalties thereon or therefor.

The present invention relates generally to flight termination systems and more particularly to a compact, economic, and remote-controlled destruct system of a type adapted for explosively severing one wing from a damaged target or drone-aircraft for thereby causing the target to fall within a prescribed impact area.

In the field of weapons development it becomes necessary to test-fire new weapons at various stages of weapons design and development. In the field of antiaircraft weapons development it often becomes necessary to provide a full scale airborne target. Consequently, remotely controlled or drone-aircraft are frequently employed for this purpose. This leads to numerous problems among which there exists a serious problem of achieving flight-termination for damaged or crippled target-aircraft. It will be appreciated that flight control mechanisms in drone-aircraft are very susceptible to weapon-induced damage. This leads to circumstances wherein a target's control mechanisms may be partially or totally destroyed, while the target yet remains aloft. Such circumstances will normally be encountered where a test of an antiaircraft weapon is only partially successful. If remote control is lost, while the target remains aloft, the uncontrolled aircraft may perform undesired and unpredictable maneuvers and frequently will proceed along an undesired course, often toward a densely populated area.

Heretofore, it has been a standard practice to provide chase-planes for purposes of shooting-down uncontrolled target-aircraft. This practice frequently proves unsatisfactory since, as is well-known, an aircraft may sustain substantial structural damage and yet remain airborne for a significant period of time. The consequences of such conditions represent significant hazards to antiaircraft weapons test operations. This is particularly true with regard to high-speed target aircraft, as the target may approach heavily populated areas before it can be overtaken and subsesuently "downed" by chase-planes and, upon being "downed" or crashing, inflict substantial serious injury to both person and property.

In the past, it has been suggested that an explosive charge may be placed on board an aircraft and detonated by remote control for causing destruction thereof. However, any such system, where employed on target-aircraft, must be both efficient and inexpensive, due to the fact that the system is intended to be operated only once. The result heretofore achieved, when utilizing such systems, has involved a loss of detonation capability and, where detonation has been achieved, an uncontrolled crashing of the aircraft, as the various surfaces of an aircraft are of an aerodynamic design, which permits portions of a destroyed aircraft to glide over great distances and cover large areas. This results in a probability that portions of a thus-destroyed target-aircraft will leave a target area or zone of impact and inflict serious damage as they come to rest.

It has been further suggested that both wings may be severed from guided missiles in order for the missile to be caused to follow a selected trajectory into a selected target. However, such systems are not compatible with flight-termination systems, which require an immediate termination of a target's flight, as the missile is caused to follow a projected trajectory.

Applicants' early attempts in solving the problem of flight-termination included a use of remotely actuated shape charges so situated as to effect a severance of only one wing of the target. Applicants discovered that by severing only one wing from the target, lift applied by other wing served to initiate a vertical dive for the target so that a substantially vertical descent could be predicted and achieved while the target was still within a selected impact area. Although this solution served to terminate the target's flight in a controlled manner, further experimentation and operational tests proved that this technique was not entirely satisfactory, since the weapon undergoing tests often destroyed the control circuit for the shaped charge located on board the target aircraft.

The purpose of the instant invention is to provide an improved destruct system which comprises an economic flight-termination system deemed to provide a satisfactory solution to the problem of effecting an immediate termination of a target-aircraft's flight.

An object of the instant invention is to provide a self-contained, effective and economic flight-termination system, which is adapted to be readily assembled from separate components and mounted beneath the main spar of one wing of a target-aircraft, and further adapted to be subsequently actuated in response to signals transmitted from a remote transmitter for effecting a severance of the wing from the target to thus effect a termination of the target's flight.

Another object is to provide in a flight-termination system for target-aircraft, a unique, compact fuze which may be selectively armed and actuated, or armed and subsequently disarmed, while the target is in flight.

Figure 2:
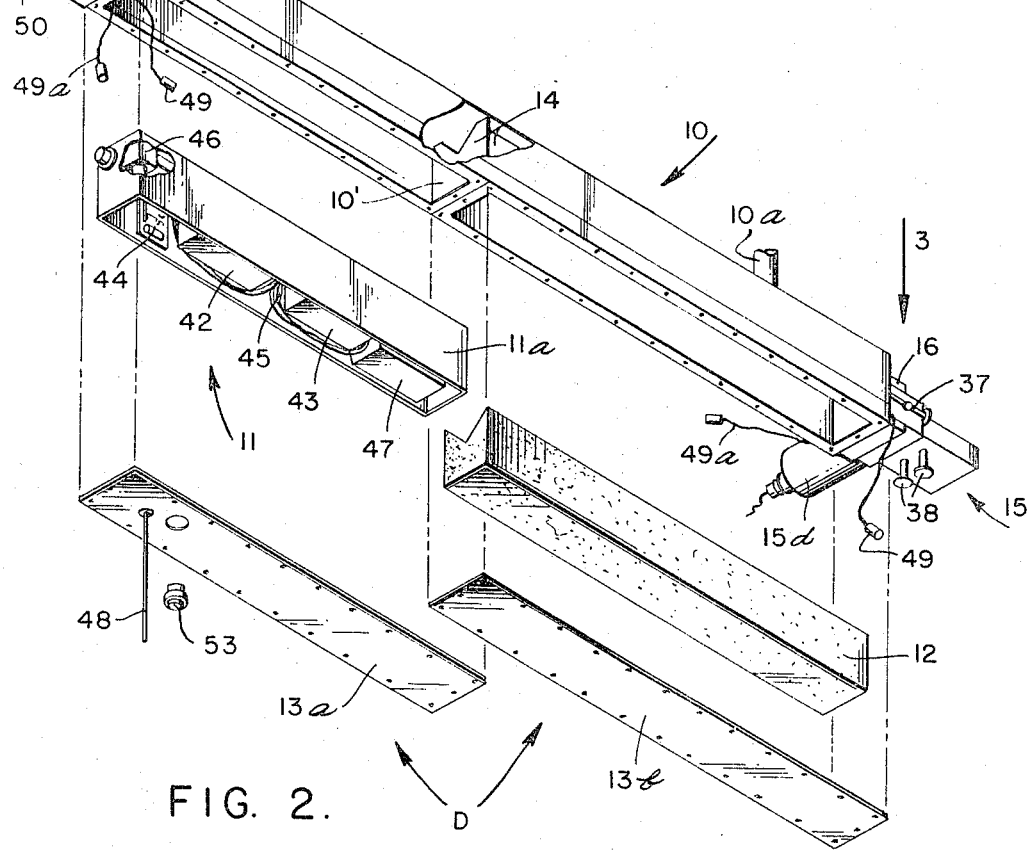
Figure 3:
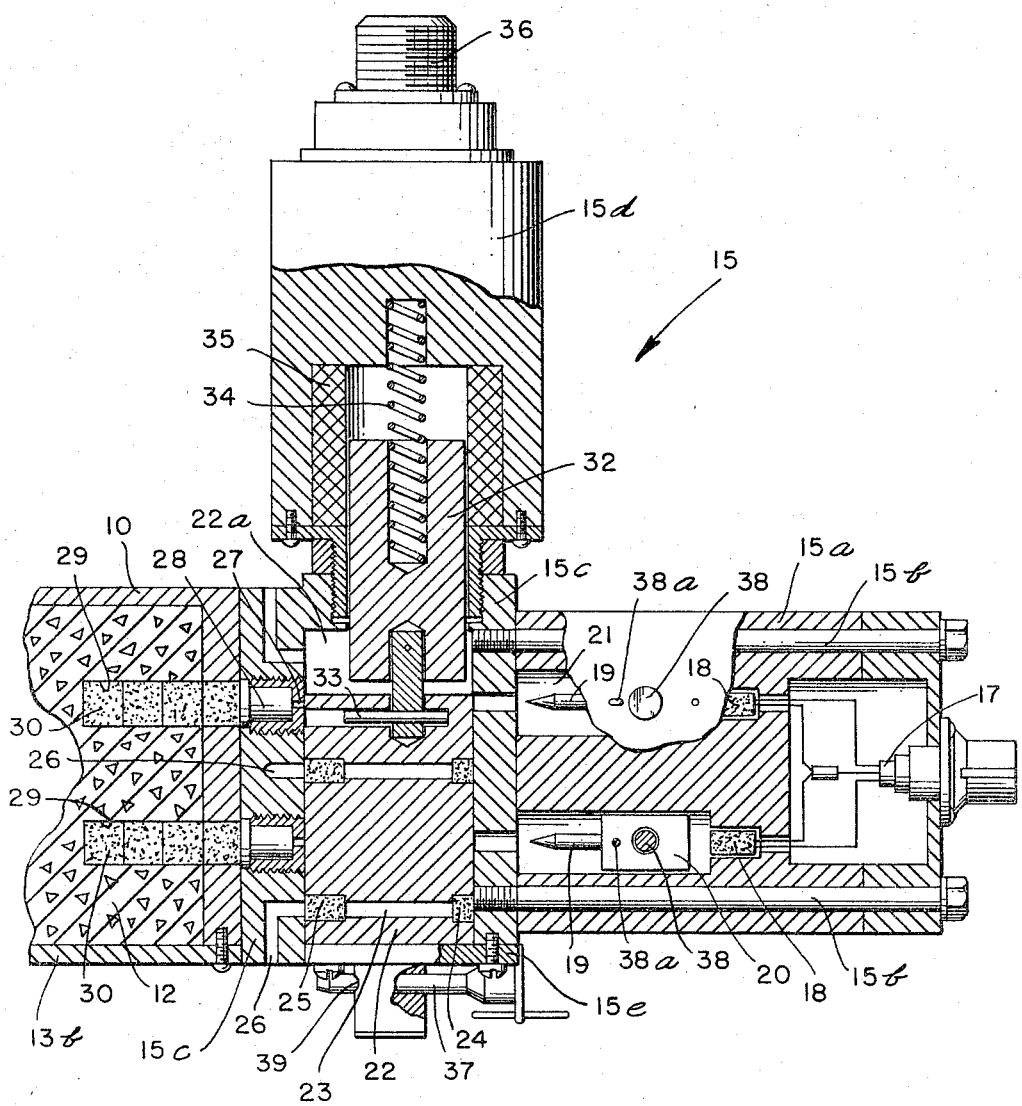
Figure 4:
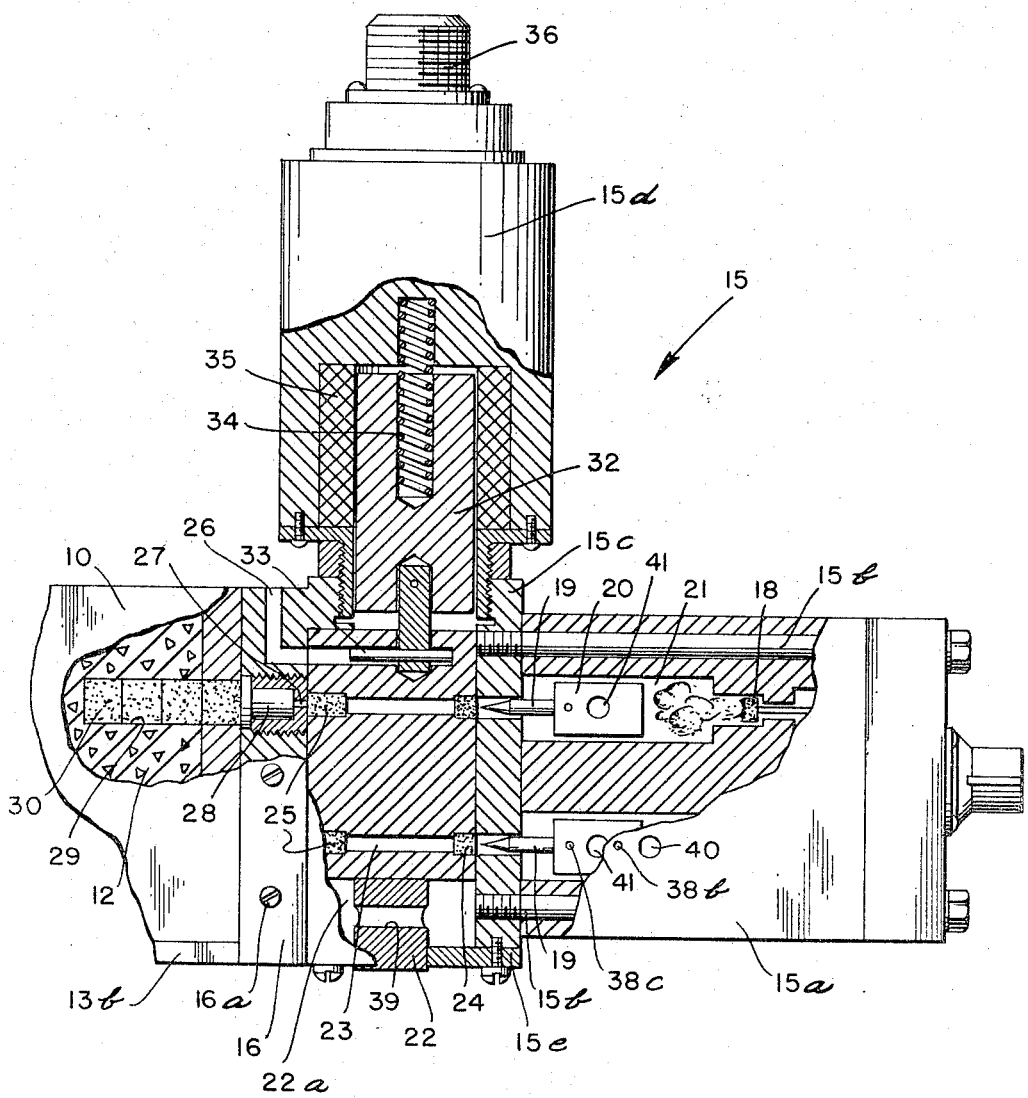
Figure 5:
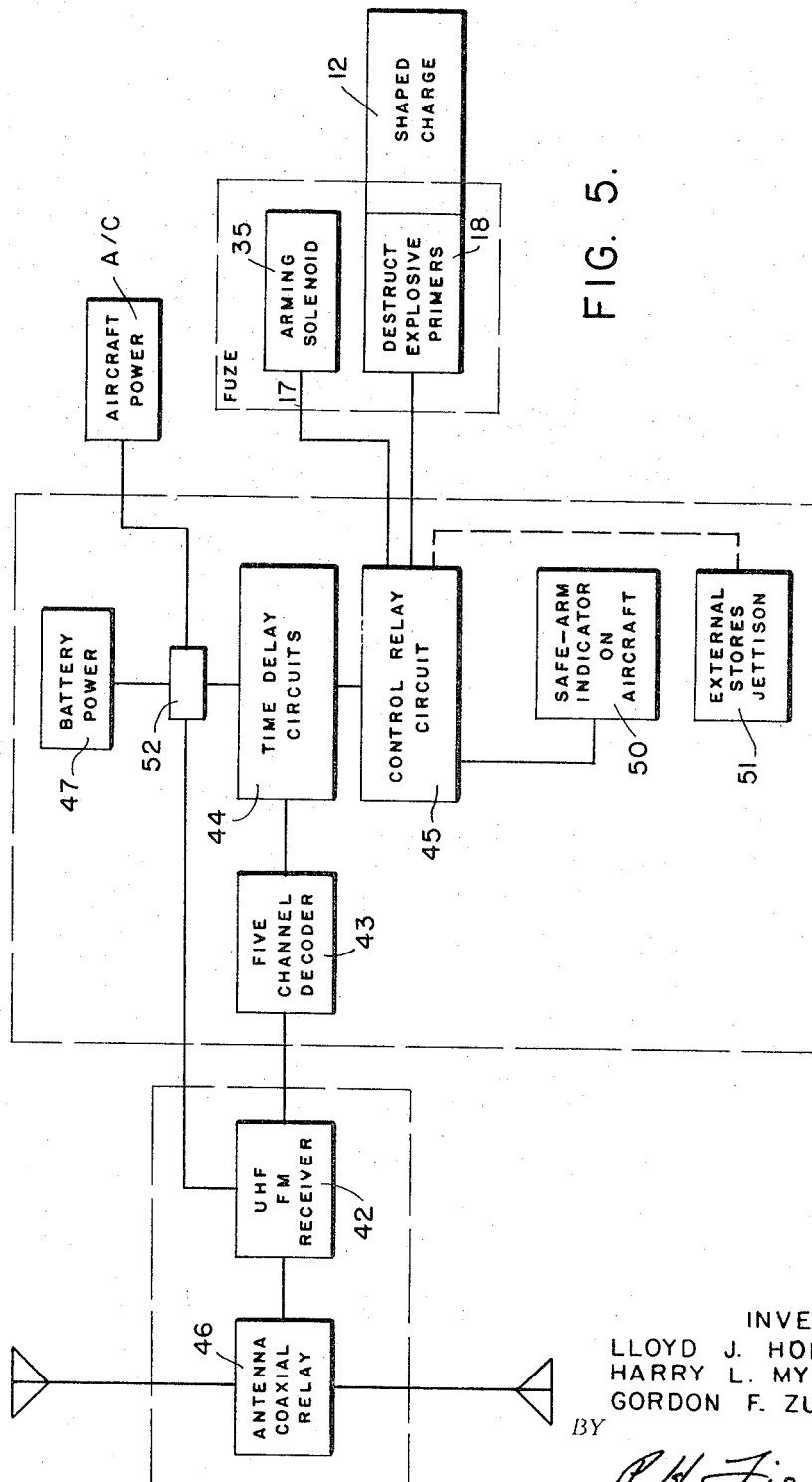

Other objects, advantages and novel features of the invention will become apparent from the following detailed description of the invention when considered in conjunction with the accompanying drawings wherein:

FIG. 1 comprises a schematic view of the device of the instant invention mounted in an operative disposition aboard a target-aircraft;

FIG. 2 comprises a partially sectioned, exploded view, on an enlarged scale, of the system shown in FIG. 1;

FIG. 3 comprises a partial cross sectional view of the fuze shown in FIGS. 1 and 2, illustrating a safe condition therefor;

FIG. 4 comprises a partial cross sectional view of the fuze of FIG. 3, in an armed and partially actuated condition; and FIG. 5 comprises a schematic view, in block form, of the flight-termination system of the instant invention.

Turning now to the drawings, wherein like reference characters designate like or corresponding parts throughout the several views, there is shown in FIG. 1 a schematic view of a target-drone or remotely controlled target-aircraft T having mounted beneath the port wing thereof the device or flight-termination system D of the instant invention. In order to insure an efficient operation for the device D, the device is mounted along the main wing spar of the target T. In practice, the device D may be supported by brackets, not shown, which attach to the side of an inboard bomb-rack located along the main spar of the wing near the target's fuselage. However, as illustrated, the device D is mounted along the main spar of the wing near a bomb-rack station. The bomb-rack, or station therefor, has been chosen as a matter of convenience as an external bomb-rack will normally be attached close to the main spar of the wing. Therefore, where any sections of the target other than those adjacent the bomb-rack are damaged, by the weapon being tested, the destruct or flight-termination system remains intact and may be actuated in response to received signals transmitted thereto from a remote source for effecting a severance of the adjacent spar and, consequently, a severance of the wing from the target.

If the weapon being tested destroys the flight-termination system D, as it is supported near the bomb-rack, the main spar of the wing or the area of the aircraft selected to be acted upon by the shaped charge will be severely damaged by the weapon. Hence, the weapon will initiate an immediate crash of the target, thus rendering an activation of the flight-termination system a needless operation, due to the fact that in instances where the main spar of a wing is severely damaged or severed by the weapon, the wing will give way causing the other or opposite wing to raise, whereupon the target T will virtually "drop" to the ground with an extremely low glide ratio and at high rate of descent.

The system or device D is encased in a container 10, FIG. 2, formed of a lightweight metal and having fixed thereto, along one surface thereof, lugs or coupling posts 10a, which, as illustrated, serve as coupling means for coupling or hanging the device D to the target T. The container 10 is separated into two compartments by a suitable bulkhead 10'. One end of the container 10 is devoted to housing electrical and radio receiver systems which serve as a control unit, generally designated 11 and hereinafter more fully described. The remaining portion of the container 10 is devoted to housing a shaped charge 12. The container 10 is sealed by a pair of removable cover plates 13a and 13b, which confine the control unit 11 and shaped charge 12 within the container 10.

In practice, the shaped charge 12 is formed in place through a conventional explosive material pouring technique. To accommodate a formation of the shaped charge 12, a V-shaped member 14 is fitted within the container 10 with the opening thereof facing a surface of the container which, in operation, will be disposed adjacent an associated wing when the device D is mounted in an operative position, as illustrated in FIG. 1. The V-shaped member 14 serves as form for shaping the charge 12 as it cures or "sets up." Hence, the shaped charge 12 will be so aligned within the device D, when mounted and detonated as to direct explosive jets, often called Monroe Jets, across the main spar of the wing to effect an efficient severance thereof.

As is well-known, when detonated, a shaped charge will provide explosive jets which may be utilized for performing explosive-cutting operations. These jets are of particular importance and desirability where a precise cutting of a structural member is required to be performed with a minimum available quantity of conventional explosive materials. Therefore, it is to be understood that by utilizing a shaped charge it is possible to provide a device which will effectively cut the main spar of an associated wing of a target in an efficient manner, while at the same time be of a practical over-all size and weight for handling purposes. For example, it has been found that a shaped charge formed of only eleven pounds of conventional explosive material, such as that commonly known as Class A Composition B, is sufficient for severing the main spar of a wing of an aircraft bearing the military designation QF9G.

In order to effect a detonation of the charge 12, a fuze 15 is provided and mounted on an external surface of the container 10 through a pair of brackets 16 secured to the container 10, at one end thereof, adjacent the shaped charge 12. The brackets 16 are provided with suitable means, such as threaded screws 16a, for example, which afford a simple and rapid coupling of the fuze 15 with the container 10. Such an arrangement is of particular importance where normal operational requirements necessitate a separate storing of the charge 12 and fuze 15, with a mating thereof to be completed on the flight-line in preparation for a launching of the target.

The fuze 15, more clearly shown in FIGS. 3 and 4, comprise a solenoid-actuated, electrically-initiated device mounted in a suitable housing, the components of which are secured together by means such as threaded pins 15b, for example. As illustrated in FIG. 3, the fuze 15 is shown in its safe condition, while in FIG. 4 the fuze 15 is shown in an armed condition, and at a point in time subsequent to a first or initial stage of an operation thereof. Referring now particularly to FIG. 3, a firing train is provided within a housing 15a and includes an electrical input 17 for applying an available initiating voltage thereto. A pair of electrically activated primers 18 are coupled in circuit parallel with the input 17 and are seated in suitable depressions within the housing. The primers 18 are of any suitable type which will simultaneously ignite when available voltage is applied thereacross from the input 17.

A pair of elongated firing pins 19 are coaxially aligned with and mounted in a pair of reciprocating heads 20. The heads 20 are disposed in elongated chambers 21 formed in the housing 15a and are in parallel alignment and extend toward the charge 12. The chambers 21 communicate with the primers 18, as they are seated in the housing 15a, in a manner such that gases of combustion generated by ignition primers 18, will enter the chambers 21 and act against the heads 20 for forcing them in displacement toward the charge 12, thereby forceably projecting the coaxially aligned firing pins 19 toward the charge.

Mounted for reciprocating displacement between the firing pins 19 and the charge 12, there is an elongated solenoid-actuated, fuze-arming member 22. The member 22 is disposed within an elongated chamber 22a formed in a housing 15c and coupled with the housing 15a in a manner such that the member 22 may be reciprocated in a transversely aligned path extending across the paths followed by the firing pins 19 as they are caused to be projected in response to an ignition of the primers 18. A pair of parallel ports or channels 23 are formed to extend through member 22 in coaxial alignment with firing-pins 19 when the fuze 15 is caused to assume an armed condition, as illustrated in FIG. 4.

Each of the ports 23 receive within one end thereof a conventional stab-primer 24, of a type which will ignite when struck by a firing pin. The stab-primers 24 are so disposed and ararnged within the ports 23 as to be struck by the firing pins 19 when the fuze 15 is in an armed condition and the firing pins 19 are caused to be projected. Consequently, the stab-primer 24 may be ignited in response to a projection of the firing pins 19. Disposed within the opposite ends of the ports 23, there is aligned a pair of detonators 25, of a type which ignite in response to an initiation of the stab-primers 24, as gases of combustion are caused to spill through the ports 23 and impinge thereon in response to an ignition of the stab-primers 24.

A pair of "safe-venting" ports 26 is provided within the housing 15c and communicate between the detonators 25 and ambient atmosphere. These ports allow undesired gases of combustion to be discharged to ambient atmosphere in the event the detonators 25 are activated when the fuze is in a safe condition, FIG. 3. However, when the fuze 15 is caused to assume an armed condition, FIG. 4, the detonators 25 become coaxially aligned with ports 27, formed to extend through the housing 15c, into which conventional booster pellets 28 are inserted during the assembly of the device D. When the device D is assembled, the ports 27 are aligned with a chamber 29, formed by drilling through the end wall of the container 10 and into the shaped charge 12. The chamber 29 serves to package a plurality of suitable booster pellets 30, which function as a means for effectively detonating the charge 12 in response to an ignition of detonators 25.

The fuze arming member 22 is mounted to be reciprocally displaced within the housing 15c through a push-pull linkage 32 coupled to the member 22 through a connecting pin 33. The linkage 32 is biased in a first direction by a compression spring 34 seated in a housing 15d for retaining the member 22 in a safe position wherein the stabprimers 24 are retained in an out-of-line alignment with firing pins 19, FIG. 3. The housing 15d is threaded into the housing 15c for effecting a coupling thereof. In order to effect an arming of the fuze 15, an electrically energizable solenoid coil 35 is mounted within the housing 15d, and is arranged adjacent the linkage 32. The coil 35 is energized through an application of an available voltage thereto through a suitable connector 36 and serves as a means for drawing the linkage 32 in a direction for moving the member 22 to an armed position for thereby forceably aligning the stabprimers 24 in the path of the firing pins 19. It will be appreciated that the spring 34 will act to force the member 22 to assume a safe position once the coil 35 is de-energized by removing the voltage applied to connector 36.

While the spring 34 should have a spring constant value sufficient for retaining the member 22 in its safe position during the target's flight, it is deemed necessary to provide positive locking means for locking or maintaining the components in a fixed safe position during the storing and handling thereof. This is effected through an employment of elongated locking pins 37 and 38, better shown in FIGS. 2 and 3. The pin 37 is utilized for securing the member 22 to a plate 15e, fixed by suitable screws to the housing 15c and accomplishes this result upon being inserted through an "eye" 39, formed in a protruding portion of the member 22, and brought into an abutting relationship with the external surface of the plate 15e. The "eye" 39 is extended through an opening fromed in the plate 15e to receive the pin 37 only when the member 22 is in its safe position. Hence, the pin 37 serves as latching means and serves to retain the member 22 in its safe position until such time as the pin 37 is manually removed from the opening 39.

The pins 38 are extended through openings 40, formed in the housing 15a, FIG. 4, and pass through openings 41 formed in the heads 20. The openings 40 and 41 are so arranged as to become coaxially aligned when the fuze 15 is in its safe condition, i.e., the firing pins 19 may be positively retained in a safe position by pins 38 until such time as the pins are manualy removed from the openings 40 and 41. It will be appreciated that the pins 37 and 38 remain in place and are to be removed only after the device D is mated with a target-aircraft and the target has been made ready for launch. In practice, a pair of cotter pins 38a, FIG. 3, are inserted through openings 38b, FIG. 4, extending through the housing 15a and into holes 38c formed in the heads 20 in parallel alignment with the openings 40 and 41. The pins 38a serve to retain the firing pins 19 in a safe position during the target's flight but will give-way or shear when the primers 18 are ignited and drive the heads 20 toward the charge 12.

As hereinbefore mentioned, the radio receiver and electrical system or control unit 11 is, when in operation, mounted within the container 10. This provides the device D with a control unit which is capable of functioning independently of the aircraft's control system, so that in the event the aircraft's control system is "hit" the device D may still function in response to remote command signals for effecting termination of the target's flight.

Since the various hereinafter described circuits, which go to make up the unit 11, are of conventional design, a detailed description thereof is omitted in the interest of brevity. With particular reference to FIGS. 2 and 5, the unit 11 includes a metal casing 11a within which there is mounted a conventional heterodyne RF (radio frequency) receiver circuit 42, an audiotone decoder 43, time delay circuits 44, a relay circuit 45, an antenna relay 46 and a +28-volt battery pack 47.

The antenna relay 46 is connected, in a conventional manner, to a receiving antenna mast 48 mounted on the external surface of the plate 13a of the container 10. However, it is deemed advisable to further connect the relay 46 to an additional antenna mast 48a, FIG. 1.

Preferably the mast is provided at a location which will enhance reception of command destruct signals. This is effected through a coaxial cable 49, which is provided to extend the length of the device D for coupling the relay 46 with the antenna 48a, by means of a conventional receptacle located in the wing of the target T. The antenna relay 46 includes a switching circuit of conventional design with the output thereof being connected to the receiver circuit 42.

The circuit 42 includes a UHF, frequency-modulated receiver circuit, also of a suitable and conventional design, which detects command signals for the device D. The output of the receiver circuit 42 is connected with the input of the decoder circuit 43. The decoder circuit 43 is also of any suitable well-known design. As presently utilized, the decoder circuit 43 comprises a five-channel decoder and employs five tuned circuits, each including a relay circuit coupled in a manner such that the tuned circuits will respond to preselected IRIG frequencies and effect a selective closing of a circuit relay in response to an output signal received from the receiver circuit 42. For safety purposes, the relays of selected channels may be connected in circuit series for thus requiring a closing of the relays of several channels before a command signal may be provided at the output of the decoder. The receiver circuit 42 further includes circuit means, not shown, for detecting signal strength and will function to energize the decoder circuit 43, through a suitable relay, also not shown, only when signals having a preselected voltage value are detected. Therefore, it will be appreciated that it is feasible to exclude many spurious signals while transmitting command signals through the receiver circuit 42, and through the decoder 43, to the device D for achieving desired functions.

While various circuit components and systems, such as digital command control systems, for example, may be designed to carry out similar functions, the present invention employs available and known circuits in order to maintain simplicity and economy. Therefore, it will be appreciated that many spurious signals, at an adequate voltage level, may be encountered for limited periods of operational time. Hence, the output of the decoder 43 is coupled with the time delay circuits 44 in a manner such that the output of the decoder 43 must pass through the time delay circuits 44 before it reaches the input of the connected control circuit 45. The delay circuits 44 may be of any suitable design which requires a continuous signal for a given period of time before the signal is passed as a command signal. Time delays of about two seconds have been found to be quite satisfactory for rejecting spurious signals encountered in normal operations.

The control circuit 45 includes a plurality of means, such as, for example, relays which serve to close power circuits between the voltage source and the fuze arming solenoid 35, for purposes of arming the fuze 15, as well as the input 17 for the primers 18, for achieving a detonation of the charge 12. A relay is also provided within the circuit 45 for opening the power circuit between the voltage source and the solenoid 35, for purposes of disarming the fuze 15 once it has been armed by a closing of the circuit. The circuit 45, in practice, also includes suitable circuit means, of well-known design, for causing a light 50 to become energized to provide a steady glow when the circuit between the voltage source and the arming solenoid 35 is open, to thus indicate a safe condition, and to alternate or "blink" when the circuit is closed, to thus indicate an armed condition for the fuze 15. This, of course, serves as a means for providing a visual warning for those connected with a progressing weapons test operations. Furthermore, if desired, a circuit means may be included within the circuit 45 and coupled with an external stores jettison circuit 51, as is normally provided for an external bomb rack, so that various types of equipment supported by the bomb-rack may be jettisoned before detonation of device D.

Since the device D is of a type which accompanies the target throughout its flight it will be appreciated that it is desirable to utilize the aircraft's voltage source, designated A/C, so long as that source remains available. This is effected through a coupling lead 49a connected with suitable power circuits through receptacles provided and fixed within the wing of the target T. As may be expected, this source can fail. Therefore it is deemed desirable to provide the device D with a voltage sensing circuit 52, coupled in circuit series between the source of power A/C and the unit 11, in order that a failure of the source A/C may be detected and an appropriate function initiated. The circuit 52 is of any suitable and known design, which may utilize suitable relay switch means for affording an opening of the power circuit to the source A/C of aircraft power and a closing of a power circuit to the battery pack 47, so that in the event aircraft power is lost at the source A/C, the condition will be sensed and battery voltage will be applied to the device D from the battery pack 47.

The device D is assembled and operated in the following manner: Into the appropriate portion of the container 10 is poured the explosive composition for forming therein the shaped charge 12. The continer 10, with the charge 12 formed therein, may be stored in an appropriate location at a magazine area. The fuze 15 may be separately assembled, with the appropriate primers and detonators seated therein, and stored at an appropriate location or magazine area in a ready-to-use state. The control unit 11 may be assembled and retained in an appropriate location, separate from the shaped charge 12 and the fuze 15, so that it may be bench-tested prior to a mounting thereof on a selected aircraft. When the device D is to be assembled, on the flight-line, the unit 11 with its battery pack 47, the charge 12, and fuze 15 are brought to the flight-line and assembled and coupled into a single unit, packaged by the container 10, and hung beneath the wing of the selected target aircraft T. The antenna lead or coaxial cable 49 and the power lead 49a are then connected with the aircraft's systems. If provided for, a conventional "shorting plug" 53 may be inserted in the circuit for completing the circuits in a conventional manner. However, the electrical leads to the fuze 15 are initially connected across a test stand, rather than to the fuze 15, so that the system may be run through an ARM, DESTRUCT and DEARM pre-flight test. After the pre-flight test is completed, appropriate system electrical leads are connected with the fuze 15, at the connector 36 and input 17, FIG. 3. If the lamp 50 glows with a "steady" beam, a safe condition of the fuze 15 is indicated. The pins 37 and 38 may be pulled from the fuze housing 15a. The device D now may be launched with target T.

Once the target T is launched and weapons test-firing made, the device D may be activated in the event control of the aircraft is "lost." In order to activate the device D, an RF signal, of given duration sufficient for activating the time-delay circuit 44, is sent to the target, picked up by the antenna 48 and/or 48a, and detected by the receiver unit 42. The RF detected signals serve to activate selected channels of the decoder 43. Where provided for, two channels may be simultaneously activated for causing a circuit to be closed between the voltage source A/C, if available, or the battery pack 47, where voltage from the source A/C is unavailable. This results in an energization of the coil 35, which functions to displace the fuze-arming member 22 from its safe position for thereby establishing an alignment of the firing train of the fuze 15 to thus impose an armed condition on the fuze 15. The light 50 now will be caused to "blink" for providing a visual warning signal for thereby indicating an armed condition for the fuze 15. The armed condition may be maintained until such time as two, or more if so provided for, additional channels of the decoder circuit 43 are selected and energized, in response to transmitted RF signals, as they are received through the receiver circuit 42. Where the additional channels are connected with the primers 18, through the input 17, destruct signals, transmitted for a period of time sufficient for being passed by the delay circuit 44, serve to effect a closing of the circuit between the available voltage source and the input 17 through the relay circuit 45, whereby an ignition of the primer 18 is achieved. The heads 20 are now caused to be displaced in response to an activation of the primers 18, with the cotter pins 38a being caused to shear as the heads 20 are thus displaced. The firing pins 19 are now caused to extend and strike the stab-primers 24, which ignite for thereby causing detonators 25 to ignite. The ignition of the detonators 25 serve to actuate the pellets 28 and 30 for thereby effecting a detonation of the charge 12. As the charge 12 is caused to detonate, an elongated explosive jet is projected from along the center of the groove formed therein and extend through the main spar of the wing of the target T. As the jet is projected through the spar, the wing is caused to be severed from the target, whereupon the other wing is caused to rise with the target T thus being caused to "drop" to the ground at a high rate of descent, whereby a flight-termination for the target T is effectively achieved in a controlled manner.

In the event that the fuze 15 is caused to arm, but control of the target subsequently is regained, the fuze 15 may be dearmed by selecting and activating yet another pair of channels of the decoder circuit 43 through a transmittance of appropriate RF signals thereto. This pair of channels serves to activate a relay for opening the circuit between the voltage source and the coil 35, whereupon the spring 34 will act to displace the fuze-arming member 22 in a direction to cause the member 22 to assume its safe position. In this condition the target T may be landed, if desired, and the fuze 15 again "locked" through an insertion of the pins 37 and 38. The device may now be disconnected from the target T, disassembled and stored as separate components for future uses.

In view of the foregoing, it will be appreciated that the instant invention provides a practical solution to a significant problem facing those involved in the testing of anti-aircraft weapons by providing a simple, efficient and economic system capable of achieving a substantially instantaneous termination of the flight of a damaged target.

Obviously many modifications and variations of the present invention are possible in the light of the above teachings. It is therefore to be understood that within the scope of the appended claims the invention may be practiced otherwise than as specifically described.

What is claimed is:

1. In a target-aircraft flight-termination system of a type having separable components for facilitating separate storage and flight-line assembly and adapted to be mounted along the main spar of one wing of a selected target and subsequently activated, through remote command signals while the target is in flight, for thereby effecting a severance of one wing from the target, means comprising in combination:

an elongated shaped charge having an elongated V-shaped groove extending the length of one side thereof adapted to be detonated for thereby establishing an elongated explosive jet;

an electrically armed and initiated fuze connected with said shaped charge adapted to arm and subsequently detonate said charge in response to voltages selectively applied thereto;

control means adapted to selectively apply a plurality of voltages to said fuze in response to command signals transmitted from a remotely disposed transmitter; and packaging means retaining said device as a single unit including coupling means adapted to couple said system to an external surface of one wing of the selected target in a manner such that the groove of the shaped charge is caused to face the surface of the wing in transverse alignment with the main spar thereof, whereby explosive jets established at the detonation of said shaped charge may be employed for severing said spar.

2. The system of claim 1 wherein said control means includes:
   a frequency modulated radio signal receiver unit;
   a voltage source;
   a decoder circuit; and
   a relay circuit, all being interconnected to provide a system adapted to receive transmitted command signals and apply a plurality of voltages to said fuze in response to said command signals.

3. The system of claim 2 wherein said packaging means comprises:
   an elongated metal container having coupling posts fixed along one side thereof and adapted for mounting the system adjacent the main spar of the wing of the associated target.

4. The system according to claim 3 wherein said fuze includes:
   a fuze housing adapted to be mounted on said container;
   at least one firing pin having a leading impact end mounted for sliding displacement along a path established within said housing;
   pyrotechnic primer means disposed adjacent said firing pin adapted to ignite in response to an electrical voltage applied thereto for thereby forceably displacing said firing pin;
   a fuze-arming member including stab-primer means mounted at a predetermined location thereon and adapted to ignite when struck by said firing pin as the pin is displaced along said path;
   charge detonating means aligned between said fuze-arming member and said shaped charge and disposed in operative communication therewith adapted to ignite in response to an ignition of said stab-primer means for thereby effecting a detonation of said shaped charge; and
   a fuze-arming member drive means including resilient means connected with said fuze-arming member adapted to retain said fuze-arming member in a first position, wherein said stab-primer means are maintained at a position located out of the path of said firing pin, and further including electrically actuatable means adapted to respond to an electrical signal for displacing said fuze-arming member against said resilient means to a second position, wherein said stab-primer means are disposed within the path of said firing pin to be struck thereby as the pin is caused to be displaced along said path.

5. In a flight-termination system for drone-aircraft of a type normally employed in target weapons development tests, means comprising in combination:
   an elongated metal container of aerodynamic design adapted to be mounted adjacent the main spar of a wing of a target-aircraft and aligned in transverse alignment therewith;
   an elongated shaped charge including means defining therein a V-shaped groove extending the length thereof fixed within said container and so aligned as to cause said groove to face and be disposed in transverse alignment with the main spar of the wing when the container is mounted on the target-aircraft;
   an electrically armed and activated charge detonating fuze mounted on said container, in operative communication with said shaped charge, including therein a charge detonating firing train adapted to be activated for detonating said charge and having disposed therein a plurality of displaceable pyrotechnic means, and further including biasing means and electrically driven means adapted to arm said fuze by displacing certain of said pyrotechnic means into firing-alignment and to disarm said fuze by displacing the same from firing-alignment;
   a system voltage source and a voltage control circuit retained by said container adapted to respond to command signals for selectively applying a plurality of voltages to said fuze;
   a command signal receiver circuit mounted in and retained by said container adapted to receive frequency modulated radio frequency signals transmitted from a remote source, and in response thereto direct command signals to said voltage control circuit, whereby said control circuit may be activated, said fuze may be armed and activated and said charge detonated; and
   releasable mounting means mounting the fuze on the container and coupling the voltage source, the voltage control circuit and the command signal receiver within said container, whereby the system may be disassembled and a separated storage and a flight-line assembly thereof may be afforded.

6. The combination of claim 5 further including:
   circuit connecting means adapted for manually connecting said system with an aircraft voltage source provided for the associated target; and
   means adapted to sense a drop in voltage present at said aircraft voltage source and in response thereto effect an electrical coupling of the system with said system voltage source, whereby the system voltage source may serve as a stand-by voltage source and become operative in response to a failure occurring at the aircraft voltage source.

References Cited by the Examiner

UNITED STATES PATENTS

| | | | |
|---|---|---|---|
| 2,973,164 | 2/1961 | Grill | 244—3.25 |
| 3,141,409 | 7/1964 | Travis et al. | 102—7 |
| 3,149,568 | 9/1964 | Gerber | 102—70.2 |

FERGUS S. MIDDLETON, *Primary Examiner.*